US007752646B2

(12) United States Patent
Lee

(10) Patent No.: US 7,752,646 B2
(45) Date of Patent: *Jul. 6, 2010

(54) METHOD FOR IDENTIFYING EXTENDER TEXT TABLE OF ELECTRONIC PROGRAM GUIDE IN DIGITAL TV

(75) Inventor: Kyung Mee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 502 days.

This patent is subject to a terminal disclaimer.

(21) Appl. No.: 11/932,788

(22) Filed: Oct. 31, 2007

(65) Prior Publication Data

US 2008/0060017 A1    Mar. 6, 2008

Related U.S. Application Data

(63) Continuation of application No. 11/704,922, filed on Feb. 17, 2007, now Pat. No. 7,594,248, which is a continuation of application No. 11/062,429, filed on Feb. 23, 2005, now Pat. No. 7,246,365, which is a continuation of application No. 09/760,840, filed on Jan. 17, 2001, now Pat. No. 6,918,133.

(30) Foreign Application Priority Data

Jan. 17, 2000  (KR) ................. 2000-2065

(51) Int. Cl.
G06F 3/00 (2006.01)
G06F 13/00 (2006.01)
H04N 5/445 (2006.01)
H04N 7/173 (2006.01)
H04N 7/16 (2006.01)

(52) U.S. Cl. ............. 725/54; 725/131; 725/139
(58) Field of Classification Search .......... 725/54, 725/131, 139
See application file for complete search history.

(56) References Cited

U.S. PATENT DOCUMENTS 6,091,772 A    7/2000  Anderson et al.

(Continued)

OTHER PUBLICATIONS

"Program and System Information Protocol for Terrestrial Broadcast and Cable", ATSC Standard of Dec. 23, 1997, prepared by the United States Advanced Television Systems Committee (ATSC) Doc. A/65.

*Primary Examiner*—Scott Beliveau
*Assistant Examiner*—Christine Kurien
(74) *Attorney, Agent, or Firm*—Birch, Stewart, Kolasch & Birch, LLP

(57) ABSTRACT

A digital television (DTV) receiver and a decoding method are discussed. According to an embodiment, the DTV receiver includes: a receiving unit for receiving a digital broadcasting signal including a plurality of extended text tables (ETTs) that appear in transport stream packets having common PID values, each ETT comprising a section header and a message body, wherein the section header contains a table identification extension field that serves to establish uniqueness of each ETT, and wherein the message body includes an extended text message (ETM) which provides detailed descriptions of a virtual channel or an event associated with each ETT; and a program and system information protocol (PSIP) decoder for detecting the table identification extension field to determine uniqueness of each ETT and detecting at least one pertinent ETT from the plurality of ETTs using the determined uniqueness of each ETT.

11 Claims, 3 Drawing Sheets

U.S. PATENT DOCUMENTS

| | | |
|---|---|---|
| 6,115,074 A | 9/2000 | Ozkan et al. |
| 6,353,930 B1 | 3/2002 | Shimoji et al. |
| 6,510,555 B1 | 1/2003 | Tsurumoto |
| 6,604,243 B1 | 8/2003 | Freimann |
| 6,918,133 B2 | 7/2005 | Lee |
| 6,961,955 B1 | 11/2005 | Durden et al. |
| 7,246,365 B2 | 7/2007 | Lee et al. |

METHOD FOR IDENTIFYING EXTENDER TEXT TABLE OF ELECTRONIC PROGRAM GUIDE IN DIGITAL TV

This application is a Continuation of co-pending application Ser. No. 11/704,922 filed on Feb. 12, 2007 now U.S. Pat. No. 7,594,248; which is a Continuation of co-pending application Ser. No. 11/062,429 filed on Feb. 23, 2005 (now U.S. Pat. No. 7,246,365 B2 issued on Jul. 17, 2007); which is a Continuation of co-pending application Ser. No. 09/760,840, filed on Jan. 17, 2001 (now U.S. Pat. No. 6,918,133 issued on Jul. 12, 2005); and for which priority is claimed under 35 U.S.C. §120; and this application claims priority of Application No. P2000-2065 filed in the Republic of Korea on Jan. 17, 2000 under 35 U.S.C. §119. The entire contents of all are hereby incorporated by reference.

BACKGROUND OF THE INVENTION

1. Field of the Invention

The present invention relates to a digital broadcasting, and more particularly, to a method for identifying extender text tables of an electronic program guide in a digital television.

2. Description of the Related Art

Generally, video and audio streams are compressed as digital information while system and program information are compressed in accordance with a program and system information protocol (PSIP) to provide digital broadcasting. Here, program information is decoded from data other than the video and audio information, and displayed on a screen for a user through an electronic program guide (EPG). The EPG and system information are combined into the PSIP and as the ATSC standard for ground wave and cable digital broadcasting, the PSIP provides a variety of information on programs by parsing messages encoded through a moving picture experts group (MPEG-2, ISO/IEC 13818-1 system) method (1997 DEC. document A/65).

The PSIP includes a plurality of tables to transmit and receive A/V data generated in MPEG-2 video and AC-3 audio formats, and to transmit information and programs on channels of broadcasting stations. Accordingly, the PSIP enables a primary function of providing A/V services for broadcast programs of selected channels as well as a secondary function of providing guide services, i.e. EPG, for the broadcast programs. Particularly, information such as information on channels for channel-selecting and packet identification digits (PID) for A/V reception is transmitted through a virtual channel table (VCT), while EPG information on broadcast programs for the channels is transmitted through an event information table (EIT).

The EIT is information regarding the events of virtual channels and includes a title and start time of each event. Here, an event is typically a TV program. Also, the PSIP can transmit at least four and at most one hundred twenty eight EITs in the format of EIT-k, where each EIT provides an event information of a specific time band.

The PSIP further includes a system time table (STT) which provides time information; a rating region table (RRT) which transmits information on regions and rating organizations, i.e. ranking programs; an extender text table (ETT) which further explains channels and broadcast programs; and a master guide table (MGT) which manages the version and PID of each table. These tables are transmitted by data structures called sections. Namely, a section is the elementary unit of each table and one or more section(s) are combined to form a complete table. Accordingly, to facilitate user interface, the EPG representing information on programs to be broadcasted on a digital television (DTV) has a variety of formats depending on the section(s) defining a table.

A widely used format of the EPG is by using a Gemstar table. In such format, an ETT which contains detailed information on an event, i.e. a broadcast program, can have event information corresponding to a unit of three hours. Also, each event information is represented and identified by an index based on a chronological order of EIT-1, EIT-1, . . . , EIT-127. Thus, an ETT is mapped with each corresponding EIT, i.e. event information corresponding to EIT-0 is mapped with ETT-0, event information corresponding to EIT-1 is mapped with ETT-1, . . . , and event information corresponding to EIT-127 is mapped with ETT-127. Here, an EIT can also represent information on events of up to three hours in a single section, where each event has an event_id field for identifying the event and an ETM_location field for displaying whether an ETT which contains detailed information on the event is present.

Furthermore, each section of the ETT comprises an ETM_id representing an event or a channel as well as detailed text information on the event or channel. The sections of tables used in PSIP have syntax types as follows.

| | |
|---|---|
| table_id | 8 bits |
| section_syntax indicator | 1 bits |
| private_indicator | 1 bits |
| reserved | 2 bits |
| section_length | 12 bits |
| table_id_extension | 16 bits |
| reserved | 2 bits |
| version_number | 5 bits |
| current_next_indicator | 1 bits |
| section_number | 8 bits |
| last_section_number | 8 bits |
| protocol_number | 8 bits |
| actual_table_data | * |
| CRC_32 | 32 bits |

The table sections, as listed above, can be for section headers of tables which have common rules of composition or for section bodies of tables which have different contents depending on the objective of a table. Here, a section header has basic information such as table_id, table_id_extension, version_number, and section_number, which identifies a section in the section header. Specific field value(s) based on such basic information which identify section(s) within the section header can be used to extract certain section(s). Namely, the section(s) with basic information which match the specific field value(s) can be extracted. This process is known as section filtering.

General formats of EIT and ETT are shown in FIG. 1. As shown, a section EIT-0 within an EIT includes a plurality of events, where each event is distinguished or identified by the event_id and the ETM_location indicates whether an ETT exists for the identified event. Also, an ETM_id within each ETT section is represented by a source_id+event_id+1sb and indicates the event to which the ETT section corresponds. For example, in the ETM_id of 'XX . . . X00000000000011XX' shown in FIG. 1, the underlined portion represents an event mapped with a corresponding event_id. In other words, an ETT-0 has a link with a corresponding event through the ETM_id in the section body.

However, information in the section header of the ETT-0 such as the table_id, the table_id_extension, the section_number, and the last_section_number includes the same value of '00000000000011' regardless of the section. Namely, each section has the same section header, excluding the version field. Thus, to process an ETT, required contents of the ETT are randomly extracted through a section header filtering according to a sequential process as shown in FIG. 2.

Referring to FIG. 2, an ETT section filter is first set (S1) and the ETT section-outs, which have been received, are detected (S2). All received ETT sections are then input (S3) and the input ETT sections are parsed (S4). Next, an ETM_id is detected depending on the result obtained from parsing the ETT sections (S5) and the detected ETM_id is compared with an event_id to determine if the values are identical (S6). If the detected ETM_id is identical to the event_id, the ETM_id is stored as a text message (S8) and the processing of the ETT ends. Otherwise, the corresponding section is dumped (S7) and a next ETM_id is detected and compared to the event_id by repeating the above process.

However, a method for identifying ETTs of an EPG of a DTV according to the related art has the following problems.

First, because the section headers of ETT sections are basically identical, a general section filtering cannot be conducted. Thus, all sections of, for example, ETT-0 corresponding to an EIT-0 are received and parsed to select a required ETT-0 section, resulting in a repeated processing of an ETT section. Second, upon receiving a command to identify whether the contents of an ETT-0 section has been changed when a version number is altered, the entire ETT-0 sections must be parsed to detect an ETM_id. Third, if ETT sections are not the same version, a section filtering based on the version cannot be performed. In other words, the method, in which different sections of the ETT-0 have the same section header, fails to meet the system standard of the moving picture experts group (MPEG) as well as to perform a section filtering of sections using the header.

SUMMARY OF THE INVENTION

Accordingly, an object of the present invention is to address at least the problems and disadvantages of the related art.

Another object of the present invention is to provide a more efficient digital broadcasting.

Another object of the present invention is to provide a more efficient method for identifying ETTs.

A further object of the present invention is to provide a method for processing ETT section header to identify ETTs.

A still further object of the present invention is to identify ETTs by processing ETT sections in the same manner as other tables of PSIP.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for identifying ETTs of an EPG in a DTV according to an aspect of the present invention includes inputting an event_id in a table_id_extension within ETT sections such that the ETT sections are identified at a receiving or a transmitting party without parsing the ETT sections. Preferably, the ETM_location values within the ETT sections are distinguishably represented such that it is possible to determine whether the ETT is transmitted from a same channel or from another channel being broadcasted. Also, ETT section headers among the ETT sections is preferably represented to determine whether the ETT section includes detailed information for channels or for events.

According to another aspect, the present invention is directed to a digital television (DTV) receiver, comprising: a receiving unit for receiving a digital broadcasting signal including a plurality of extended text tables (ETTs) that appear in transport stream packets having common PID values, each ETT comprising a section header and a message body, wherein the section header contains a table identification extension field that serves to establish uniqueness of each ETT, and wherein the message body includes an extended text message (ETM) which provides detailed descriptions of a virtual channel or an event associated with each ETT; and a program and system information protocol (PSIP) decoder for detecting the table identification extension field to determine uniqueness of each ETT and detecting at least one pertinent ETT from the plurality of ETTs using the determined uniqueness of each ETT.

According to another aspect, the present invention is directed to a digital television (DTV) receiver, comprising: a receiving unit for receiving a digital broadcasting signal including a plurality of event extended text tables (ETTs) that appear in transport stream packets having common PID values, each event ETT comprising a section header and a message body, the section header containing a table identification extension field, the message body containing an extended text message which provides detailed descriptions of an event associated with each event ETT, wherein the table identification extension field defines an event identification (ID) of the event to establish uniqueness of each event ETT; and a decoder for detecting the event ID of the event to determine uniqueness of each event ETT and detecting at least one pertinent event ETT from the plurality of ETTs using the detected event ID.

According to another aspect, the present invention is directed to a method of decoding a broadcast signal in a digital television (DTV) receiver, the method comprising: receiving a digital broadcast signal including a plurality of extended text tables (ETTs) that appear in transport stream packets having common PID values, each ETT comprising a section header and a message body, the section header containing a table identification extension field that serves to establish uniqueness of each ETT, the message body containing an extended text message (ETM) which provides detailed descriptions of a virtual channel or an event associated with each ETT; detecting the table identification extension field to determine uniqueness of each ETT; and detecting at least one pertinent ETT from the plurality of ETTs using the determined uniqueness of each ETT.

According to another aspect, the present invention provides a method of decoding a broadcast signal in a digital television (DTV) receiver, the method comprising: receiving a digital broadcast signal including a plurality of event extended text tables (ETTs) that appear in transport stream packets having common PID values, each event ETT comprising a section header and a message body, the section header containing a table identification extension field, the message body containing an extended text message which provides detailed descriptions of an event associated with each event ETT, wherein the table identification extension field defines an event identification (ID) of the event to establish uniqueness of each event ETT; detecting the event ID of the event to determine uniqueness of each event ETT; and detecting at least one pertinent event ETT from the plurality of ETTs using the detected event ID.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
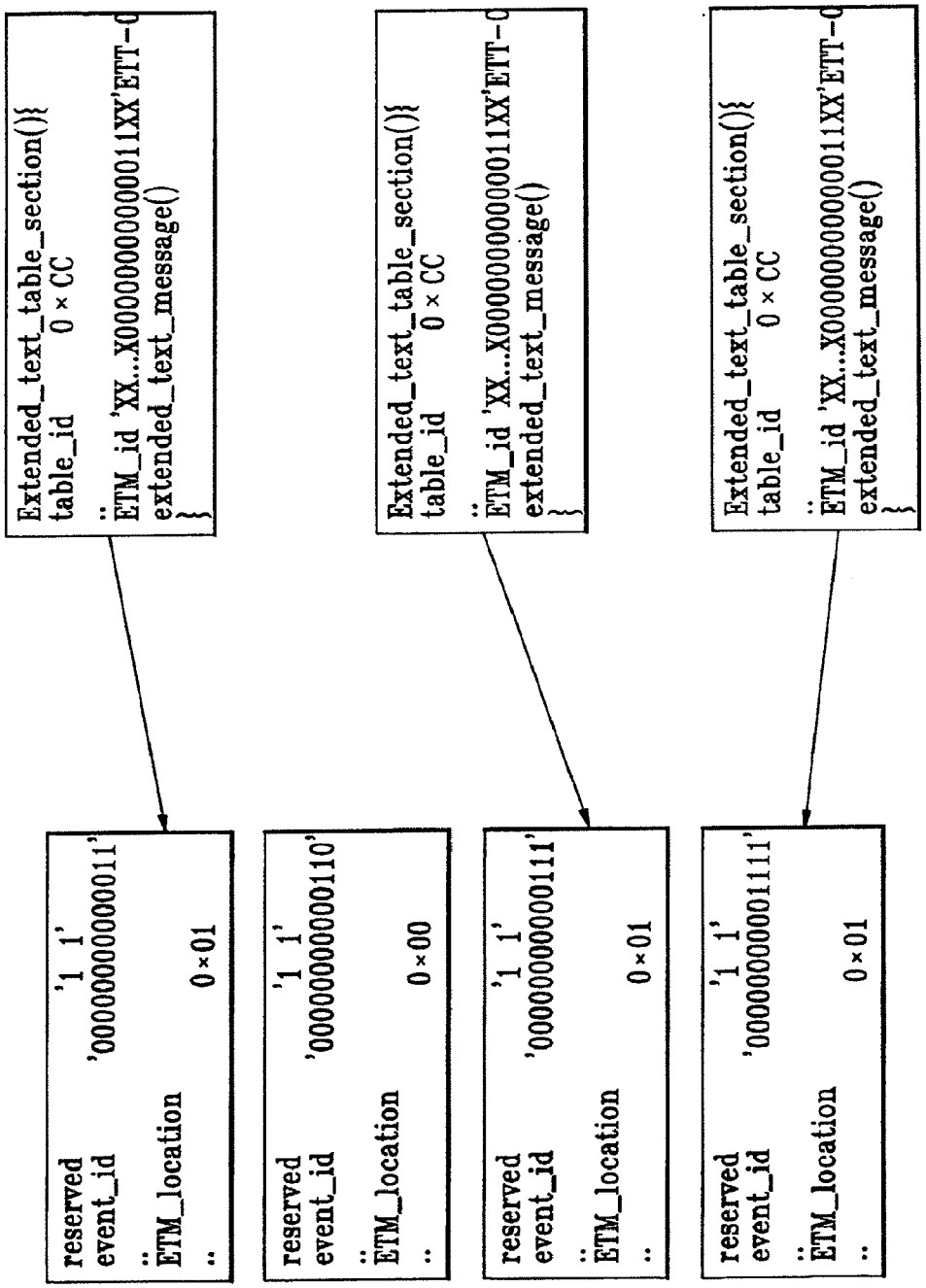
FIG. 1 shows an EIT and ETT in the related art.
Figure 2:
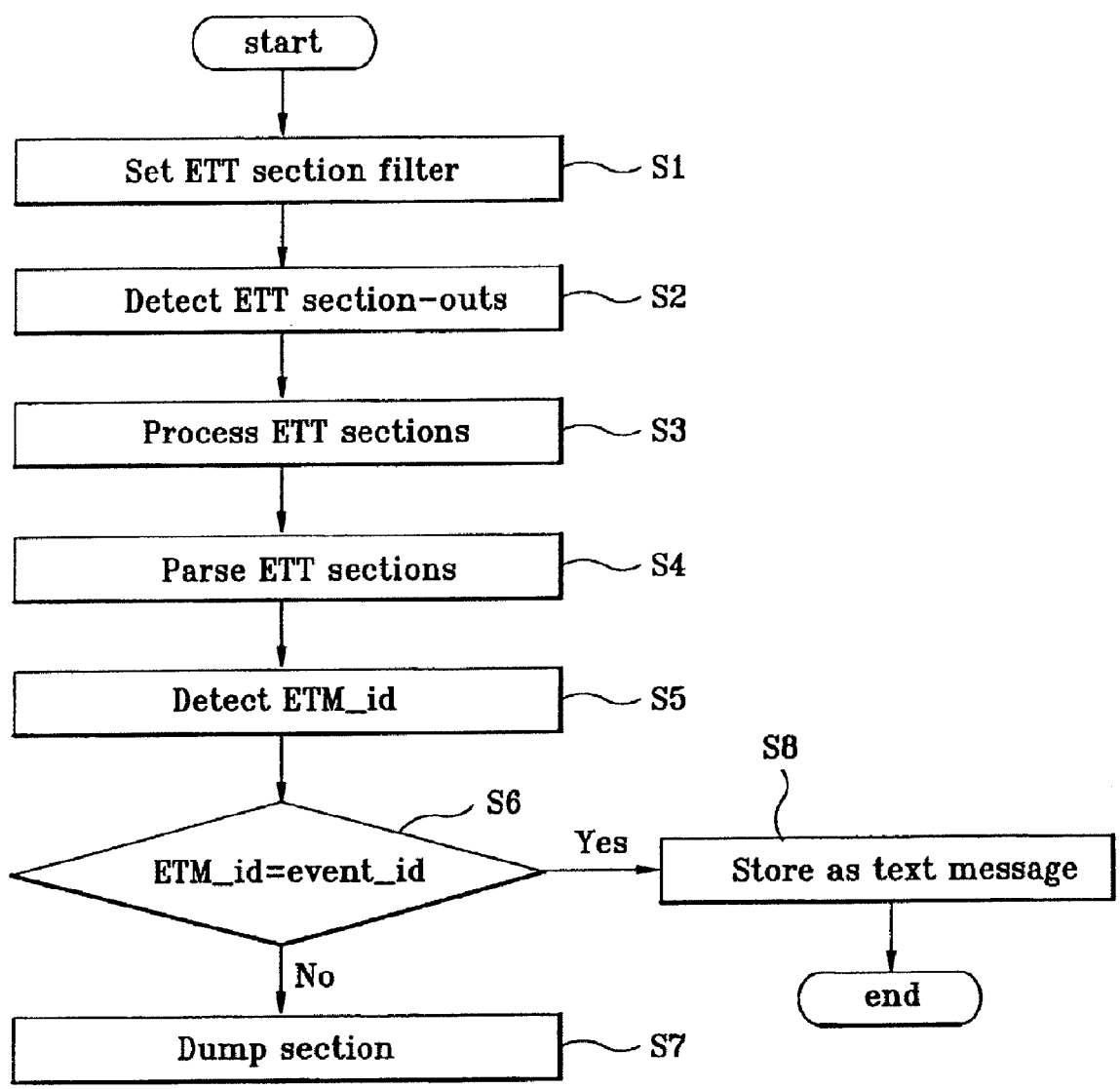
FIG. 2 is a flowchart of a method for processing ETT sections in the related art.

Reference will now be made in detail to the preferred embodiments of the present invention, examples of which are illustrated in the accompanying drawings. In the following description, well-known functions or constructions will not be described in detail.

According to the present invention, ETT sections are generally identified by a section header through a table_id_extension. Namely, an event_id is input into the table_id_extension to represent a corresponding event. Thus, a general section filtering method can be used to process only the section(s) necessary at a receiver.

A method for identifying ETTs of an EPG in a DTV according to the present invention will next be described in detail, where Table 1 below shows the syntax types of table sections used in the PSIP.

TABLE 1

| Bit stream syntax for the ETT in A/65(PSIP document) | | | |
|---|---|---|---|
| extended_text_table_section ( ) { | | | |
| table_id | 8 | 0xC7 | |
| section_syntax_indicator | 1 | '1' | |
| private_indicator | 1 | '1' | |
| reserved | 2 | '11' | |
| section_length | 12 | uimsbf | |
| table_id_extension | 16 | 0x0000 | uimsbf |
| reserved | 2 | '11' | |
| version_number | 5 | uimsbf | |
| current_next_indicator | 1 | '1' | |
| section_number | 8 | 0x00 | |
| last_section_number | 8 | 0x00 | |
| protocol_version | 8 | uimsbf | |
| ETM_id | 32 | uimsbf | |
| extended_text_message( ) | var | | |
| CRC_32 | 32 | rpchof | |
| } | | | |

The present invention distinguishes and identifies the ETT sections by inserting an event_id into a table_id_extension, where the table_id_extension is commonly used in ETT header sections with a fixed value of 0x00. Particularly, a table_id_extension is composed of 16 bits and according to the present invention, 14 bits of the 16 bits represent an event_id and residual 2 bits remain. One of the residual 2 bits may be used for identifying whether a value of an ETM_location is 0x01 or 0x02, and the other residual bit may be used for identifying whether the ETT section is related to channels or to events.

For example, an ETM_location value of 0x01 may indicate that the ETT is transmitted from the same channel as the EIT. In such case, an ETM_location value of 0x02 would indicate that the ETT is transmitted from a channel actually being broadcasted. Accordingly, whether an ETT section is related to channels, which are currently being transmitted, or related to events can be determined by values of 0x01 or 0x02 represented in the table_id_extension. Also, the other bit contains information on whether an ETT section has detailed information on channels or on events, and can be distinguished through the ETT section header.

For example, a table_id_extension may be composed as shown in Table 2 below.

TABLE 2

| table_id_extension (16 bits) | | |
|---|---|---|
| event/channel | value corresponding to ETM-location | event-id |
| 0/1 | 0/1 | XX XXXX XXXX XXXX |

By inputting a value, which can distinguish and identify an ETT section, into the table_id_extension as shown in Table 2, a section filtering can be executed and thus, required ETT section(s) can be selectively received. For example, if an event_id requires detailed information on events represented in '00 0000 0000 1111,' the event_id selectively receives ETT section(s) having a table_id of 0xCC and table_id-extension having values corresponding to '00 0000 0000 1111.'

Figure 3:
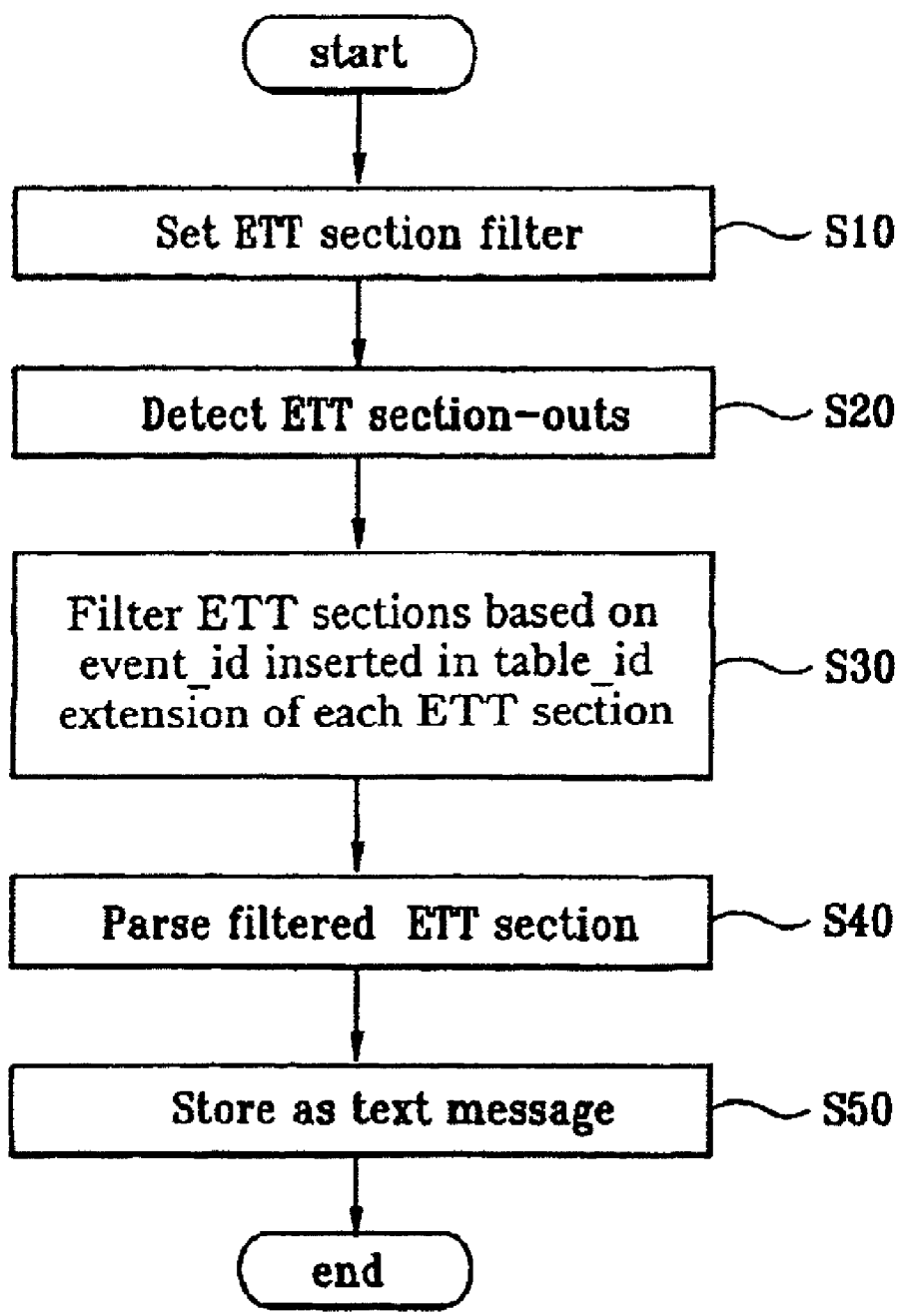
FIG. 3 is a flowchart of a method for processing ETT sections according to an embodiment of the present invention.

Referring to FIG. 3, in processing an ETT according to the present invention, an ETT section filter is initially set (S 10). The ETT section-outs are then detected (S20), and pertinent ETT section(s) is(are) filtered and detected (S30) using the event_id inserted in the table_id_extension of the ETT sections. Next, the detected ETT section(s) is(are) parsed (S40) and the parsed section(s) is(are) stored as a text message (S50).

Accordingly, in the present invention, an ETT of EPG is generated by inserting an event_id in a table_id_extension of each ETT section header to identifies an event to which an ETT section corresponds. Also, an ETM_location value may be inserted in the table_id_extension to distinguish whether an ETT section is transmitted from the same channel as EIT, and/or a value may be inserted in the table_id_extension to distinguish whether detailed information in an ETT section is for channels or for events.

Similarly, a method for identifying ETTs of an EPG comprises inserting an event_id in a table_id_extension of each ETT sections before transmitting the ETT sections to a receiver; and section filtering, at the receiver, the received ETT sections based upon the event_id to identify an ETT section. Namely, an ETT section can be identified by setting an ETT section filter; detecting ETT section-outs; section filtering and detecting at least one pertinent ETT section using the event_id in the table_id_extension of each ETT sections; parsing the detected at least one ETT section; and storing each parsed ETT section as a text message.

Furthermore, if the table_id_extension is available for section identification, a version processing according to the section can be performed. Specifically, when contents of a section changes, a version_number is accordingly altered to represent the change. As a result, a transmitter can determine which ETT section is to be transmitted with changed contents by referring to a section header, and can produce and use a section filter. Thus, if the contents of a section among the ETT sections are changed, a transmitter can change the version of section(s) for section(s) with changed contents because the sections are distinguishable. Similarly, a receiver can filter and receive the section(s) with values corresponding to the changed version. Namely, ETT sections can be filtered at the receiver by detecting ETT sections with values corresponding to a specific version.

As described above, a method for identifying ETTs of an EPG in a DTV according to the present invention has the following advantages. First, the method can filter ETT sections without receiving all sections and/or repeatedly filtering the unnecessary sections. Second, the method may use a value which can identify each ETT section and allow a control of the version. Third, the method maintains an existing section header while employs a table_id_extension field of 0x00, i.e. the same value as in the section header, thereby being compatible with existing receivers.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital television (DTV) receiver, comprising:
   receiving means for receiving a digital broadcasting signal including a plurality of program and system information protocol (PSIP) tables;
   a section filter for detecting extended text tables (ETTs) that appear in transport stream packets having common PID values by section-filtering the plurality of PSIP tables, each ETT comprising a section header and a section body, the section header including a table identification extension field that serves to establish uniqueness of each ETT, the section body including an extended text message (ETM) which provides detailed descriptions of a virtual channel or an event associated with each ETT;
   a program and system information protocol (PSIP) decoder for detecting at least one pertinent ETT from the ETTs; and
   a storage unit for storing an extended text message (ETM) included in the detected ETT.

2. The digital television (DTV) receiver of claim 1, wherein the table identification extension field defines a first value indicating an event identification (ID) to which each ETT corresponds.

3. The digital television (DTV) receiver of claim 2, wherein the table identification extension field has a 16-bit integer value.

4. The digital television (DTV) receiver of claim 3, wherein 14 bits of the 16-bit integer value of the table identification extension field represent the event ID.

5. The digital television (DTV) receiver of claim 2, wherein the table identification extension field further defines a second value indicating whether each ETT and its corresponding event information table (EIT) are transmitted from a same channel.

6. The digital television (DTV) receiver of claim 2, wherein the table identification extension field further defines a second value identifying each ETT as being one of an event and channel ETT.

7. A digital television (DTV) receiver, comprising:
   receiving means for receiving a digital broadcast signal including a plurality of program and system information protocol (PSIP) tables;
   a detecting unit for detecting extended text tables (ETTs) that appear in transport stream packets having common PID values, each ETT comprising a section header and a section body, the section header including a table identification (ID) extension value such that separate ETT instances appearing in the transport stream packets have a unique table ID extension value, the section body including an extended text message (ETM) which provides detailed descriptions of a virtual channel or an event associated with each ETT;
   a program and system information protocol (PSIP) decoder for detecting at least one pertinent ETT from the ETTs detected by the detecting unit; and
   a storage unit for storing an extended text message (ETM) included in the ETT detected by the PSIP decoder.

8. A digital television (DTV) receiver comprising:
   a receiving unit for receiving a digital broadcast signal including a plurality of extended text table (ETT) instances that are conveyed in transport stream packets of a same PID value, each ETT instance including a section header containing a table identification (ID) extension field and a section body containing an extended text message (ETM) which provides a detailed textual description of a virtual channel or an event associated with each ETT instance, wherein the table ID extension field is set to a value such that the separate ETT instances have a unique table ID extension value;
   a program and system information protocol (PSIP) decoder for parsing at least one PSIP table included in the digital broadcast signal; and
   a storage unit for storing the parsed PSIP table.

9. A method of processing a digital broadcast signal in a digital television (DTV) receiver, the method comprising:
   receiving a digital broadcast signal including a plurality of extended text table (ETT) instances that are conveyed in transport stream packets of a same PID value, each ETT instance including a section header containing a table identification (ID) extension field and a second body containing an extended text message (ETM) which provides a detailed textual description of a virtual channel or an event associated with each ETT instance, wherein the table ID extension field is set to a value such that the separate ETT instances have a unique table ID extension value;
   parsing at least one program and system information protocol (PSIP) table included in the digital broadcast signal in a PSIP decoder; and
   storing the parsed PSIP table in a storage unit.

10. A digital television (DTV) transmitter comprising:
    a program and system information protocol (PSIP) generator for generating at least one PSIP table, the PSIP generator having a function of generating a plurality of extended text table (ETT) instances that are conveyed in transport stream packets of a same PID value, each ETT instance including a section header containing a table identification (ID) extension field and a section body containing an extended text message (ETM) which provides detailed textual description of a virtual channel or an event associated with each ETT instance, wherein the table ID extension field is set to a value such that the separate ETT instances have a unique table ID extension value;
    a PSIP encoder for encoding the at least one PSIP table; and
    a transmitting unit for transmitting a digital broadcast signal including the encoded PSIP table.

11. A method of processing a digital broadcast signal in a digital television (DTV) transmitter, the method comprising:

generating at least one program and system information protocol (PSIP) table and a plurality of extended text table (ETT) instances that are conveyed in transport stream packets of a same PID value, each ETT instance including a section header containing a table identification (ID) extension field and a section body containing an extended text message (ETM) which provides detailed textual description of a virtual channel or an event associated with each ETT instance, wherein the table ID extension field is set to a value such that the separate ETT instances have a unique table ID extension value;

encoding the at least one PSIP table; and transmitting a digital broadcast signal including the encoded PSIP table.

* * * * *